United States Patent
Wu et al.

(10) Patent No.: US 11,467,316 B2
(45) Date of Patent: Oct. 11, 2022

(54) TECHNOLOGIES FOR IN-SITU CALIBRATION OF MAGNETIC FIELD MEASUREMENTS

(71) Applicant: HALLIBURTON ENERGY SERVICES, Houston, TX (US)

(72) Inventors: Hsu-Hsiang Wu, Sugar Land, TX (US); Wenquan Li, Kingwood, TX (US); Faisal Farooq Shah, Houston, TX (US); Brian Roberson, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 444 days.

(21) Appl. No.: 16/338,946

(22) PCT Filed: Dec. 12, 2016

(86) PCT No.: PCT/US2016/066189
§ 371 (c)(1),
(2) Date: Apr. 2, 2019

(87) PCT Pub. No.: WO2018/111221
PCT Pub. Date: Jun. 21, 2018

(65) Prior Publication Data
US 2021/0278562 A1     Sep. 9, 2021

(51) Int. Cl.
*G01V 13/00*   (2006.01)
*G01V 3/26*    (2006.01)
*G01V 3/30*    (2006.01)

(52) U.S. Cl.
CPC ............ *G01V 13/00* (2013.01); *G01V 3/26* (2013.01); *G01V 3/30* (2013.01)

(58) Field of Classification Search
None
See application file for complete search history.

(56) References Cited

U.S. PATENT DOCUMENTS 5,574,374 A * 11/1996 Thompson ............... G01V 3/28
                                                        324/338
6,218,842 B1 * 4/2001 Bittar ...................... G01V 3/30
                                                        324/339

(Continued)

OTHER PUBLICATIONS

International Search Report and Written Opinion; PCT Application No. PCT/US2016/066189; dated Dec. 12, 2016.

*Primary Examiner* — Douglas X Rodriguez
(74) *Attorney, Agent, or Firm* — Polsinelli PC

(57) ABSTRACT

Systems, methods, and computer-readable media for in-situ calibration of magnetic field measurements. In some examples, a method can involve generating a magnetic field via a magnetic field source that is coupled to a downhole tool. The magnetic field source can be located within a fixed distance from one or more sensors coupled to the downhole tool. The method can also involve obtaining respective field measurements of the known magnetic field from the one or more sensors, and comparing the respective field measurements from the one or more sensors with respective reference measurements previously obtained from the one or more sensors to yield respective comparisons. The method can then involve determining, based on the respective comparisons, a respective sensitivity drift for each of the one or more sensors.

17 Claims, 7 Drawing Sheets

(56) References Cited

U.S. PATENT DOCUMENTS

2011/0012620 A1 1/2011 Rosthal et al.
2015/0331138 A1* 11/2015 Estes ..................... G01V 7/04
  324/346
2016/0299252 A1 10/2016 Zacharko et al.

* cited by examiner

400

| ABSOLUTE FIELD IN-SITU CALIBRATION | 408A | 408B | | 408N |
|---|---|---|---|---|
| SENSOR INDEX | SENSOR 1 | SENSOR 2 | ... | SENSOR N |
| 402 — SENSITIVITY DATA IN LAB (REFERENCE FIELD) | 100nT | 101nT | ... | 105nT |
| 404 — SENSITIVITY DATA IN THE FIELD | 99nT | 111.1nT | ... | 110.25nT |
| 406 — IN-SITU CALIBRATION COEFFICIENT | 0.99 (99/100) | 1.1 (111.1/101) | ... | 1.05 (110.25/105) |

| RELATIVE FIELD IN-SITU CALIBRATION | 408A | 408B | | 408N |
|---|---|---|---|---|
| SENSOR INDEX | SENSOR 1 | SENSOR 2 | ... | SENSOR N |
| 422 — SENSITIVITY DATA IN LAB | 100nT | 101nT | ... | 105nT |
| 424 — COEFFICIENT IN LAB (NORMALIZED BY A FIELD) | 1 (USE SENSOR 1 AS NORMALIZATION) | 1.01 (101/100) | | 1.05 (105/100) |
| 426 — SENSITIVITY DATA IN THE FIELD | 99nT | 111.1nT | ... | 110.25nT |
| 428 — COEFFICIENT IN FIELD (NORMALIZED BY A FIELD) | 1 (USE SENSOR 1 AS NORMALIZATION) | 1.1222 (111.1/99) | ... | 1.11364 (110.25/99) |
| 430 — IN-SITU CALIBRATION COEFFICIENT | 1 | 1.11109 (1.1222/1.01) | ... | 1.06061 (1.11364/1.05) |

*FIG. 4B*

TECHNOLOGIES FOR IN-SITU CALIBRATION OF MAGNETIC FIELD MEASUREMENTS

CROSS-REFERENCE TO RELATED APPLICATIONS

This application is a national stage entry of PCT/US2016/066189 filed Dec. 12, 2016, said application is expressly incorporated herein in its entirety.

TECHNICAL FIELD

The present technology pertains to measuring magnetic fields using sensors, and more specifically to in-situ calibration of magnetic field measurements from downhole sensors.

BACKGROUND

Service companies often place sensors on downhole tools in order to measure various downhole conditions. For example, service companies may place magnetic field sensors on a downhole tool to measure a magnetic field at the downhole location where the sensors reside. The sensors can then detect and measure a magnetic field from one or more sources, such as an Earth magnetic field, an AC electromagnetic source, a magnet, etc.

Unfortunately, because of the high temperature and pressure environment downhole, the sensitivity of such sensors may be drifted. The drifting can further depend on the various temperature ranges, logging periods, applications, as well as the dynamic range of parameters from a downhole operation environment. In a controlled environment, such as a lab or surface environment, it is extremely difficult—and perhaps impossible—to anticipate all of the factors that may cause sensitivity drift during downhole operations or calibrations. Not surprisingly, measurements from downhole sensors can quickly become skewed and largely unreliable. Consequently, service companies often operate at a significant disadvantage without accurate measurements of downhole conditions and limited understanding of downhole magnetic field parameters.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4A illustrates an absolute in-situ calibration table;

FIG. 4B illustrates a relative in-situ calibration table;

DETAILED DESCRIPTION

Figure 1A:
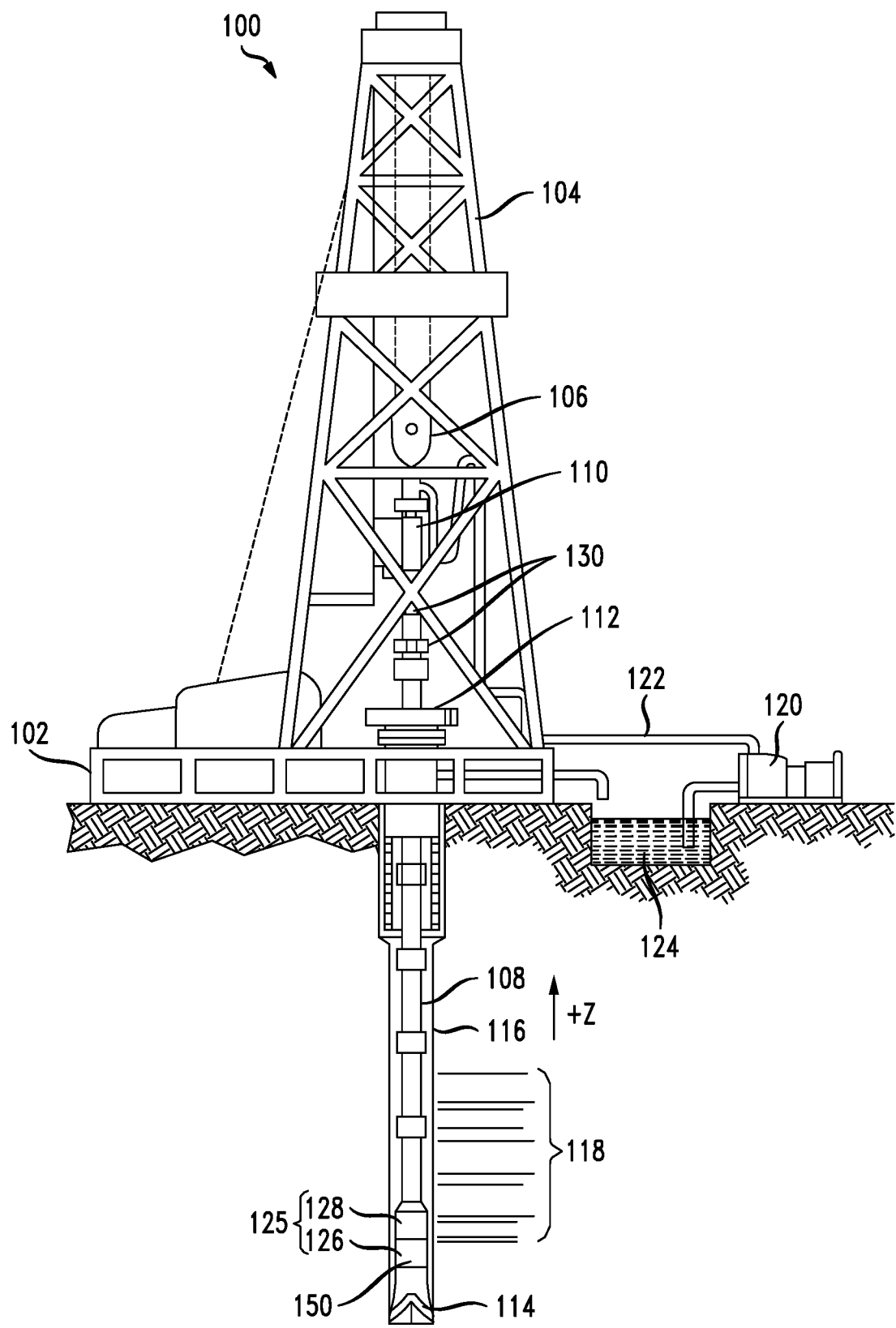
FIG. 1A illustrates a diagrammatic view of a logging while drilling (LWD) wellbore operating environment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "coupled" is defined as connected, whether directly or indirectly through intervening components, and is not necessarily limited to physical connections. The term "substantially" is defined to be essentially conforming to the particular dimension, shape or other word that substantially modifies, such that the component need not be exact. For example, substantially rectangular means that the object in question resembles a rectangle, but can have one or more deviations from a true rectangle. The phrase "wellbore tubular" is defined as one or more types of connected tubulars as known in the art, and can include, but is not limited to, tubing, production tubing, jointed tubing, coiled tubing, casings, liners, drill pipe, landing string, combinations thereof, or the like. The term "transceiver" is defined as a combination of a transmitter/receiver in one package but can include a separate transmitter and a separate receiver in one package or two packages.

As used herein, the "position" of an object can refer to a placement of the object, location of the object, angle of the object, plane of the object, direction of the object, distance of the object, azimuth of the object, axis of the object, inclination of the object, horizontal position of the object, vertical position of the object, and so forth. Moreover, the "position" of an object can refer to the absolute or exact position of the object, the measured or estimated position of the object, and/or the relative position of the object to another object.

The disclosed technology addresses the need in the art for accurate and efficient calibration of sensor measurements downhole. The calibration approaches herein can perform calibrations in real-time processing or post-processing, at any given time or depth. The technologies herein can also be used as a surface verification system so field operators can test sensor functionality at surface before running the sensor downhole.

Figure 1B:
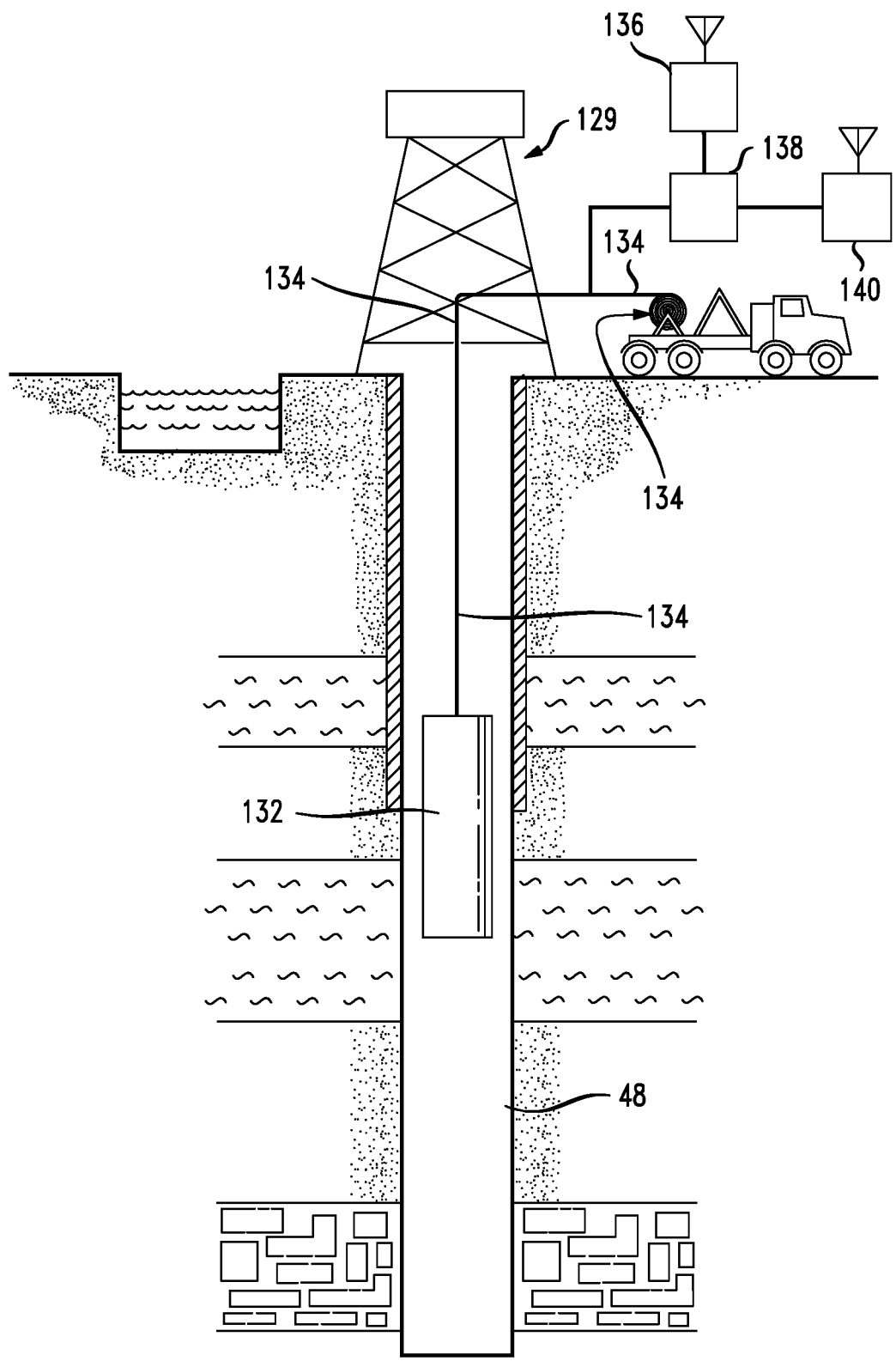
FIG. 1B illustrates a schematic diagram of an example system for downhole line detection in a downhole environment having tubulars.

Disclosed are systems, methods, and computer-readable storage media for in-situ calibration of magnetic field measurements downhole. A brief introductory description of exemplary systems and environments, as illustrated in FIGS. 1A and 1B, is first disclosed herein. A detailed description of various methods, systems, and concepts for magnetic field measurements and calibrations, as shown in FIGS. 2-5, will then follow. The disclosure will conclude with a description of example computing devices which can be implemented for various operations and functions disclosed herein. These variations shall be described herein as the various embodiments are set forth. The disclosure now turns to FIG. 1A.

FIG. 1A illustrates a diagrammatic view of a logging while drilling (LWD) wellbore operating environment 100 in which the presently disclosed apparatus, method, and system, may be deployed in accordance with certain exemplary embodiments of the present disclosure. As depicted in FIG. 1A, a drilling platform 102 is equipped with a derrick 104 that supports a hoist 106 for raising and lowering a drill string 108. The hoist 106 suspends a top drive 110 suitable for rotating the drill string 108 and lowering the drill string 108 through the well head 112. Connected to the lower end of the drill string 108 is a drill bit 114. As the drill bit 114 rotates, the drill bit 114 creates a wellbore 116 that passes through various formations 118. A pump 120 circulates drilling fluid through a supply pipe 122 to top drive 110, down through the interior of drill string 108, through orifices in drill bit 114, back to the surface via the annulus around drill string 108, and into a retention pit 124. The drilling fluid transports cuttings from the wellbore 116 into the pit 124 and aids in maintaining the integrity of the wellbore 116. Various materials can be used for drilling fluid, including oil-based fluids and water-based fluids.

Logging tools 126 can be integrated into the bottom-hole assembly 125 near the drill bit 114. As the drill bit 114 extends the wellbore 116 through the formations 118, logging tools 126 collect measurements relating to various formation properties as well as the orientation of the tool and various other drilling conditions. The bottom-hole assembly 125 may also include a telemetry sub 128 to transfer measurement data to a surface receiver 130 and to receive commands from the surface. In at least some cases, the telemetry sub 128 communicates with a surface receiver 130 using mud pulse telemetry. In some instances, the telemetry sub 128 does not communicate with the surface, but rather stores logging data for later retrieval at the surface when the logging assembly is recovered.

Each of the logging tools 126 may include a plurality of tool components, spaced apart from each other, and communicatively coupled with one or more wires. The logging tools 126 may also include one or more computing devices 150 communicatively coupled with one or more of the plurality of tool components by one or more wires. The computing device 150 may be configured to control or monitor the performance of the tool, process logging data, and/or carry out the methods of the present disclosure.

In at least some instances, one or more of the logging tools 126 may communicate with a surface receiver 130 by a wire, such as wired drillpipe. In other cases, the one or more of the logging tools 126 may communicate with a surface receiver 130 by wireless signal transmission. In at least some cases, one or more of the logging tools 126 may receive electrical power from a wire that extends to the surface, including wires extending through a wired drillpipe.

Additionally, logging tools 126 may include a resistivity logging tool, for example, the LWD resistivity logging tool 200 depicted in FIG. 2A (described further below). Resistivity logging tools may be used to provide an indication of the electrical resistivity of rock formations surrounding a wellbore. The electrical resistivity data is useful in ascertaining the presence or absence of hydrocarbons in the subterranean formations. A typical resistivity tool includes a transmitter antenna and at least two receiver antennas located at different distances from the transmitter antenna along the axis of the tool. The transmitter antenna is used to transmit electromagnetic waves into the surrounding formation. In turn, the magnetic field in the formation induces an electrical voltage in each receiver antenna. Due to geometric spreading and absorption by the surrounding earth formation, the induced voltages in the two receiving antennas have different phases and amplitudes. The phase difference and amplitude ratio (attenuation) of the induced voltages in the receiver antenna are indicative of the resistivity of the formation.

Referring to FIG. 1B, a tool having tool body 132 can be employed with "wireline" systems, in order to carry out logging or other operations. For example, instead of using the drill string 108 of FIG. 1A to lower tool body 132, which may contain sensors or other instrumentation for detecting and logging nearby characteristics and conditions of the wellbore and surrounding formation. For example the tool body 132 may include resistivity logging tool 200 depicted in FIG. 2A (described further below). The tool body 132 can be lowered into the wellbore 48 by conveyance 134 as shown in FIG. 1B. The conveyance 134 can be anchored in the drill rig 129 or portable means such as a truck. The conveyance 134 can be one or more wires, slicklines, cables, or the like, as well as tubular conveyances such as coiled tubing, joint tubing, or other tubulars.

The illustrated conveyance 134 provides support for the tool, as well as enabling communication between the tool processors on the surface and providing a power supply. The conveyance 134 can include fiber optic cabling for carrying out communications. The conveyance 134 is sufficiently strong and flexible to tether the tool body 132 through the wellbore 48, while also permitting communication through the wireline conveyance 134 to local processor 138 and/or remote processors 136, 140. Additionally, power can be supplied via the conveyance 134 to meet power requirements of the tool. Alternatively, e.g. for slickline or coiled tubing configurations, power can be supplied downhole with a battery or via a downhole generator.

Figure 2A:
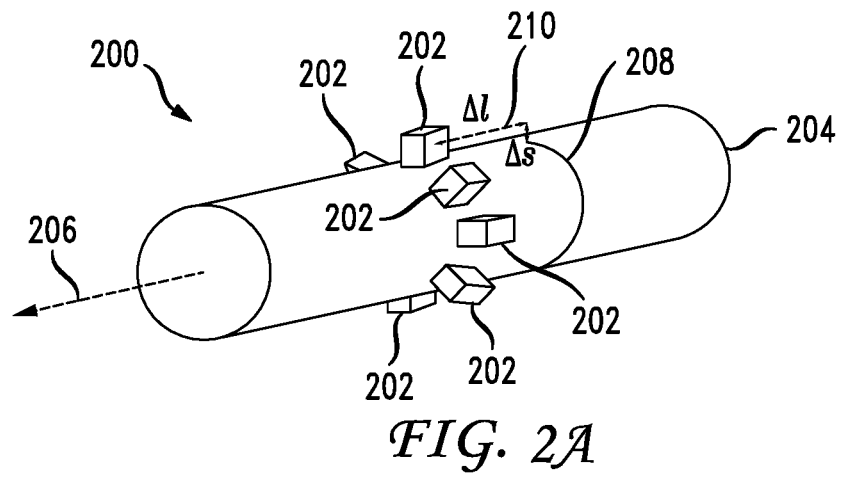
FIGS. 2A through 2C, illustrate example calibration configurations.
Figure 2B:
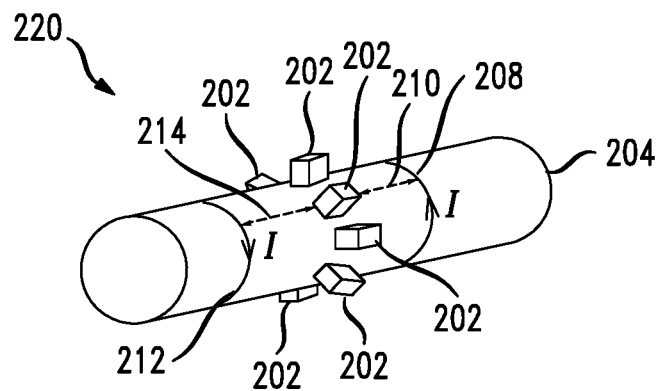
Figure 2C:
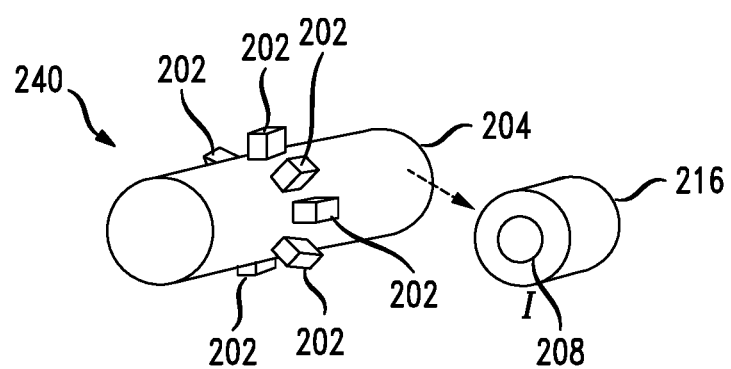

The disclosure now turns to FIGS. 2A through 2C, which illustrate example calibration configurations. FIG. 2A illustrates a first calibration system 200, which includes a sensor sub 204 having sensors 202 at different azimuth angles of the sensor sub 204. The sensor sub 204 can be associated with any downhole tool. For example, the sensor sub 204 can be part of a bottom hole assembly (BHA) (e.g., BHA 125).

The sensors 202 can be any sensors capable of detecting magnetic fields, such as magnetometers. The number of sensors 202 can vary on different applications from 1 sensor to N sensors.

The sensor sub 204 can include a magnetic field source 208 capable of generating a magnetic field. The magnetic field source 208 can be located within a fixed distance 210 from the sensors 202 in the z direction 206. The fixed distance 210 can be within a range of the magnetic field generated by the magnetic field source 208. The sensors 202 can thus measure the strength and characteristics of the magnetic field generated by the magnetic field source 208, as well as any magnetic fields generated by any other magnetic field sources within a range. For example, the sensors 202 can capture the Earth magnetic field.

The magnetic field source 208 can include a current source for generating a magnetic field of a known or predetermined distribution. The current source can be a constant current source, an alternating current source, or other forms of varying current. For explanation purposes, the current source will be described herein as a constant current source.

In some examples, the magnetic field distribution from the magnetic field generated by the magnetic field source 208 can remain consistent even at different temperatures and/or pressure environments. Accordingly, the magnetic field generated by the magnetic field source 208 can be used to determine the sensitivity drift of the sensors 202 downhole, as further explained below.

The magnetic field source 208 can a coil of any shape, such as an antenna coil, a solenoid, a toroid, etc. With reference to FIG. 2B, the calibration system 220 can include a second magnetic field source 212 coupled to the sensor sub 204. For example, the sensor sub 204 can include a second coil for generating a magnetic field.

The magnetic field source 212 can be located within a fixed distance 214 from the sensors 202 in the z direction 206. The fixed distance 214 can be within a range of the magnetic field generated by the magnetic field source 212. This will allow the sensors 202 to capture any magnetic field generated by the magnetic field source 212. The fixed distance 214 can be the same as the fixed distance 210 associated with the first magnetic source 208. However, in some cases, the fixed distances 210, 214 can vary.

With reference to FIG. 2C, in calibration system 240, the magnetic field source 208 can be located on a different sub 216 from the sensor sub 204. The magnetic field source 208 can be installed inside the different sub 216. In some cases, the magnetic field source 208 can be installed on the outside of the different sub 216, around a circumference of the different sub 216.

Figure 3:
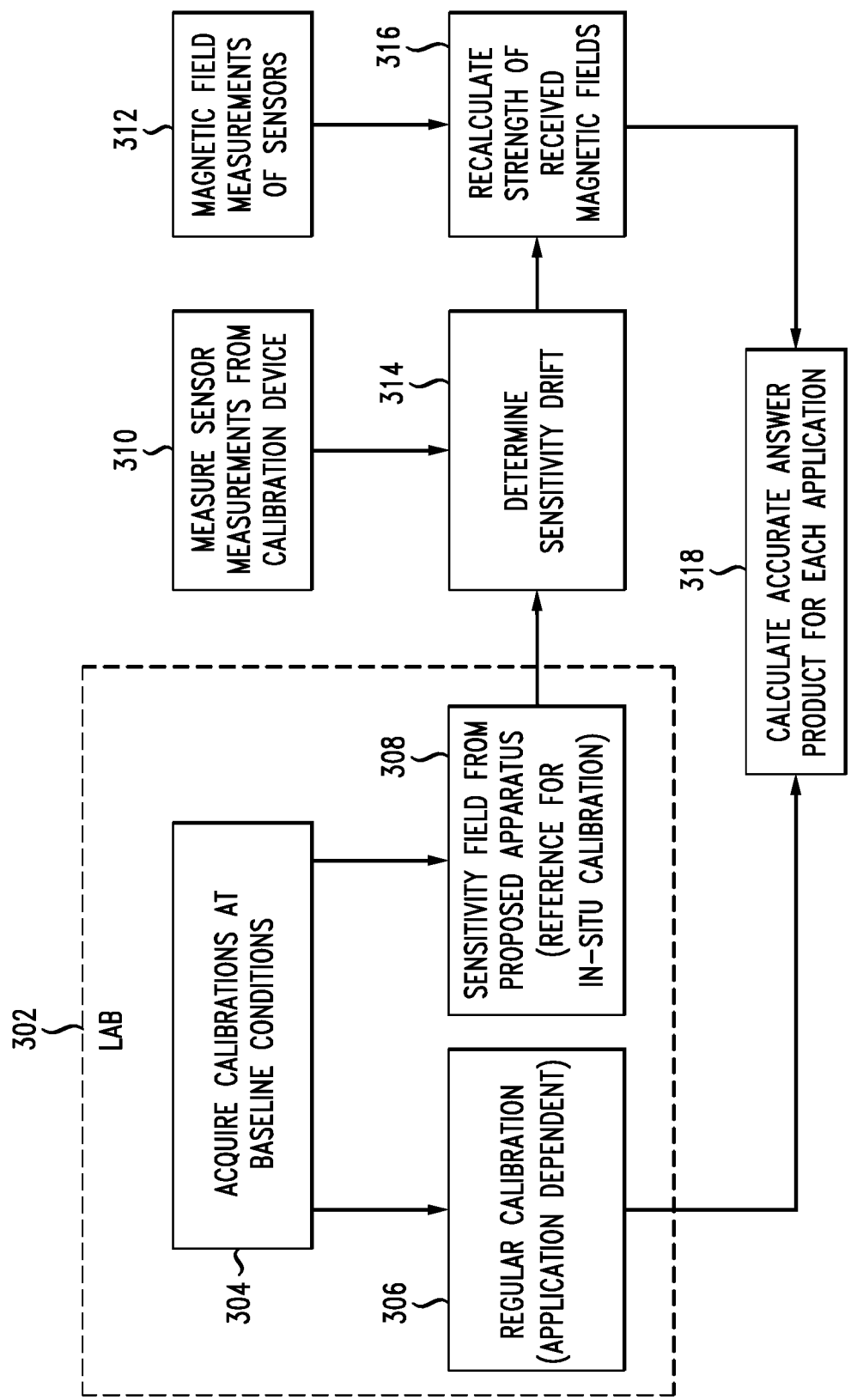
FIG. 3 illustrates an example flowchart for a calibration scheme.

FIG. 3 illustrates an example flowchart 300 for a calibration scheme. First, the process can involve obtaining calibrations 304 at baseline conditions. The baseline conditions can be based on a controlled environment 302, and may include, without limitation, controlled temperature, pressure, and so forth.

Calibrations 306, 308 can be performed in the controlled environment 302. Calibration test 306 can be a regular calibration based on related applications in order to obtain a first coefficient. Calibration test 308 can be performed based on the magnetic calibration device (e.g., magnetic source 208) in order to obtain a coefficient under controlled conditions.

At calibration test 310 the magnetic calibration device can measure the sensor measurements on the field. At calculation 314, the sensitivity drift can be calculated based on the calibration test 310 on the field and the calibration test 308 on the controlled environment 302.

The magnetic field measurements 312 from sensors 202 and the sensitivity drift 314 can be used to recalculate the strength of the received magnetic fields 316. The recalculated strength of the received magnetic fields 316 and the regular calibration 306 can be used to calculate an answer product for each application 318.

FIG. 4A illustrates an example absolute field in-situ calibrations table 400. The table 400 can include, for sensors 408A-408N, lab sensitivity data 402 which is calculated in a controlled environment, such as a lab or clean environment, and field sensitivity data 404 calculated on the field.

The lab sensitivity data 402 can include one or more values representing magnetic field measurements in a controlled environment from each of the sensors 408A-408N.

The field sensitivity data 404 can include one or more values representing magnetic field measurements on the field (e.g., downhole) from each of the sensors 408A-408N.

The table 400 can also include an absolute in-situ calibration coefficient 406. The absolute in-situ calibration coefficient 406 can be calculated for each sensor by dividing the field sensitivity data 404 for that sensor by the lab sensitivity data 402 for that sensor. The absolute in-situ calibration coefficient 406 for each of the sensors 408A-408N can be used for in-situ calibration of measurements from the sensors 408A-408N. For example, real-time, downhole measurements from the sensors 408A-408N can be adjusted by the absolute in-situ calibration coefficient 406 to obtain each sensor's true or adjusted measurement, which can account for any sensitivity drift.

Referring to FIG. 4B, a relative field in-situ calibrations table 420 can include relative measurements and calibrations 422-430. Lab sensitivity data 422 can include sensitivity measurements taken in a controlled environment for each of the sensors 408A-408N. The lab calibration coefficient 424 can be a relative coefficient calculated by dividing a sensor's lab sensitivity data 422 with the lab sensitivity data of the reference sensor. For example, assume sensor 408A is assigned to be the reference sensor. Thus, any relative calculations performed for other sensors will be relative to sensor 408A. Accordingly, in this example, the lab calibration coefficient 424 for sensor 408B can be calculated by dividing the lab sensitivity data 422 of sensor 408B with the lab sensitivity data 422 of the references sensor, sensor 408A.

Field sensitivity data 426 can include sensitivity measurements taken on the field (e.g., downhole) for each of the sensors 408A-408N. Field calibration coefficient 428 can be a relative coefficient calculated by dividing the field sensitivity data 426 of a sensor with the field sensitivity data 426 of the reference sensor. To illustrate, based on our previous example where sensor 408A is set as the reference sensor, the field calibration coefficient of sensor 408B can be calculated by dividing the field sensitivity data 426 of sensor 408B with the field sensitivity data 426 of sensor 408A.

The lab calibration coefficient 424 and field calibration coefficient 428 can then be used to calculate the relative in-situ calibration coefficient 430. To illustrate, the relative in-situ calibration coefficient 430 of sensor 408B can be calculated by dividing the field calibration coefficient 428 of sensor 408B by the lab calibration coefficient 424 of sensor 408B.

The relative in-situ calibration coefficient 430 can represent the sensitivity drift of the associated sensor. Accordingly, the relative in-situ calibration coefficient 430 can be used to calibrate downhole sensors in real-time during operation, or verify calculations either on the field or the lab. For example, the relative in-situ calibration coefficient 430 can be used to adjust measurements taken from the sensors on the field in order to yield calibrated measurements which will more accurately depict the true measurements by accounting for any sensitivity drift resulting from specific downhole conditions such as, without limitation, extreme temperatures and pressure.

Figure 5:
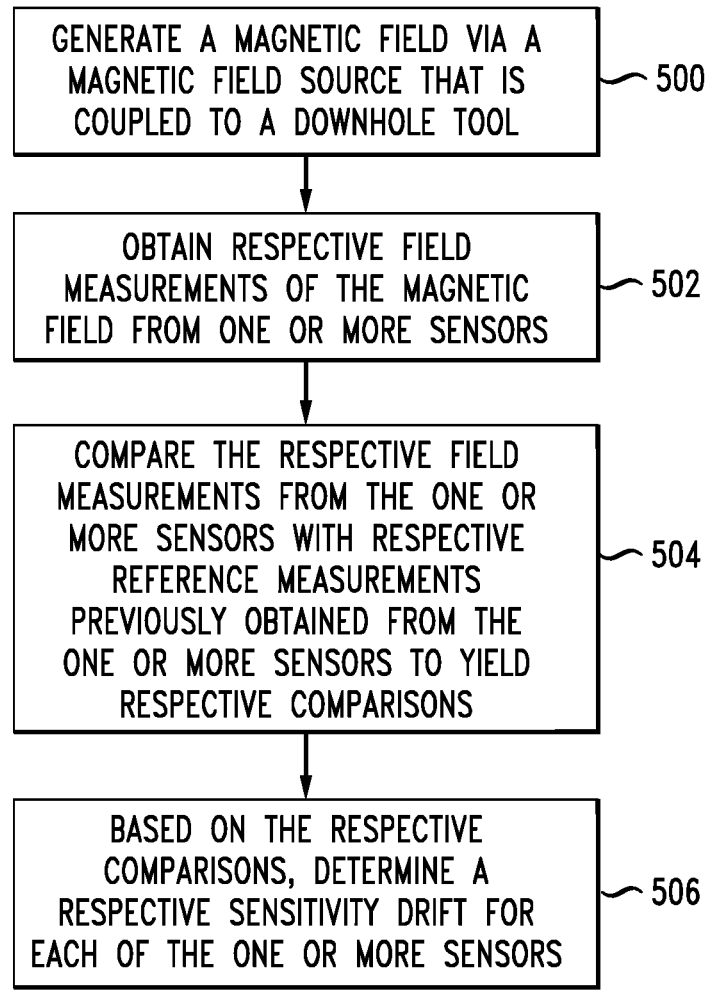
FIG. 5 illustrates an example method embodiment.
Figure 6:
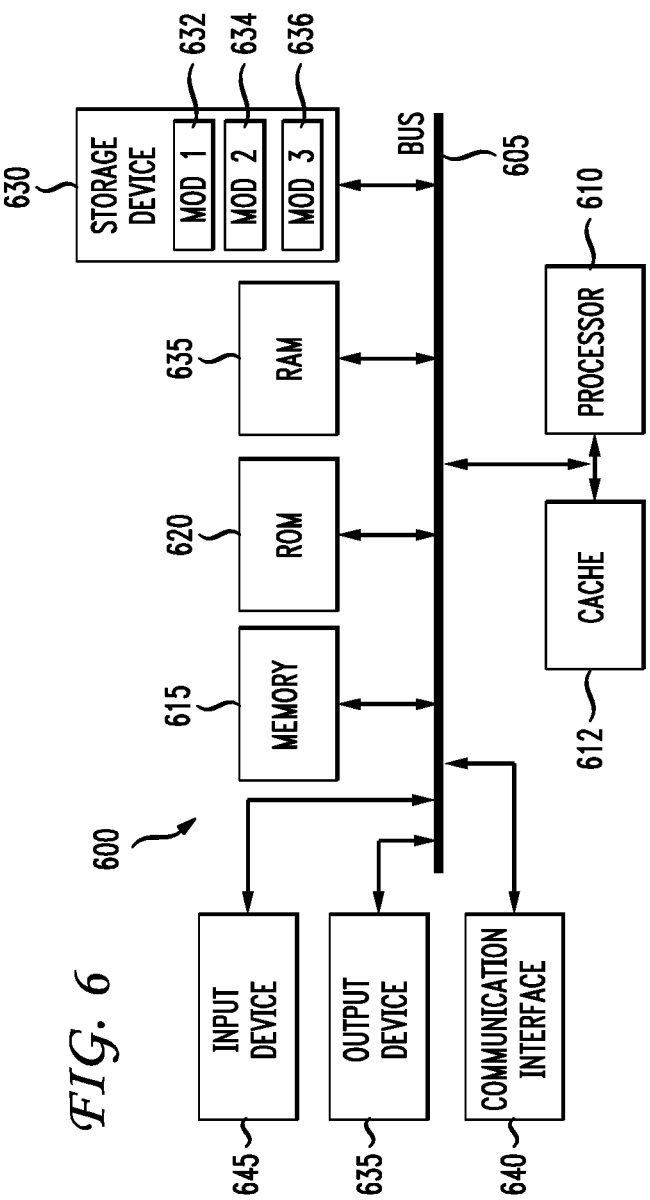
FIG. 6 illustrates schematic diagram of example computing device.

Having disclosed some basic system components and concepts, the disclosure now turns to the example method embodiment shown in FIG. 5. For the sake of clarity, the method is described in terms of calibration system 200, as shown in FIGS. 1A and 1B, and computing device 600, as shown in FIG. 6. The steps outlined herein are exemplary and can be implemented in any combination thereof, including combinations that exclude, add, or modify certain steps.

At step 500, the magnetic field source 208 can generate a magnetic field. The magnetic field source 208 can be coupled to a downhole tool, such as sensor sub 204. In other examples, the magnetic field source 208 can be coupled to other downhole tools or components. For example, the magnetic field source 208 can be coupled to a bottom hole assembly (BHA) (e.g., BHA 125) and/or one or more subs associated with the BHA (e.g., subs 126, 128).

As previously explained, the magnetic field source 208 can be coupled to the downhole tool (e.g., sensor sub 204) within a fixed distance 210 from sensors 202, which are also coupled to the downhole tool. The fixed distance 210 can be a predetermined distance which is expected to remain constant at least for a period when some measurements are taken. In some examples, the fixed distance 210 can be calculated based on a range of the magnetic field generated by the magnetic field source 208 and/or a sensitivity of the sensors 202. For example, the fixed distance 210 can be set to within a proximity range that would allow the sensors 202 to detect and measure a magnetic field generated by the magnetic field source 208.

In some examples, the sensors 202 can be placed around a circumference of the downhole tool or around a z axis 206. Similarly, the magnetic field source 208 can be placed around the circumference or z axis 206 of the downhole tool. However, the particular angles and placements of the sensors 202 and magnetic field source 208 can vary in different examples, as long as they are maintained within the fixed distance 210.

The magnetic field source 208 can be, for example, a coil of any shape, such as an antenna coil, a toroid, a solenoid, etc. Moreover, the magnetic field source 208 can be configured to receive a current from a current source. The current can be a known or predetermined current which will cause the magnetic field source 208 to generate a magnetic field of a known distribution. The current can also be a reliable or stable current to avoid any miscalculations resulting from current instability. If the current source of the magnetic field source 208 is drifted, an adjustable resistor can be installed to ensure that the current amplitude remains constant.

At step 502, the sensors 202 can obtain respective field measurements of the magnetic field. The respective field measurements can be obtained by the sensors 202 from a downhole location. Moreover, the respective field measurements can be obtained by the sensors 202 in real-time and/or during operations.

The sensors 202 can transmit the respective field measurements to a computing device, such as computing device 600 illustrated in FIG. 6, for processing and/or calculations. Computing device 600 can be communicatively coupled with the sensors 202 either directly or indirectly. Moreover, computing device 600 can reside on the surface, downhole, on a remote location, or any other location as long as computing device 600 is able to receive the respective field measurements obtained from the sensors 202.

At step 504, a computing device 600 can compare the respective field measurements from the sensors 202 with respective reference measurements previously obtained from the sensors 202. The respective reference measurements can be measurements taken from the sensors 202 in a controlled environment, such as a lab or clean environment. Thus, the respective reference measurements can reflect the measurements from sensors 202 under normal temperature, pressure, and other conditions.

At step 506, the computing device 600 can determine, based on the comparison performed at step 504, a respective sensitivity drift for each of the sensors 202. The sensitivity drift can be an absolute coefficient (e.g., absolute calibration coefficient 406) as described with reference to table 400, or a relative calibration coefficient (e.g., relative in-situ calibration coefficient 430) as described with reference to table 420.

The sensitivity drift can be used to calibrate future measurements obtained from the sensors 202 while on the field (e.g., downhole). The sensitivity drift can correct any drift experienced by the sensors resulting from the abnormal or extreme conditions on the field, such as the temperatures, pressure, etc., downhole. Indeed, the sensitivity drift can ensure that measurements or sensitivity parameters associated with the sensors 202 remain constant and accurate at different temperatures, pressure, and other conditions.

The sensitivity drift can be implemented to calibrate measurements in real-time or post-processing at any given time and/or depth. The sensitivity drift can also be implemented as a surface verification system so field operators can test sensor functionality at surface before running the sensors 202 downhole.

FIG. 6 illustrates example computing device which can be employed to perform various steps, methods, and techniques disclosed above. The more appropriate embodiment will be apparent to those of ordinary skill in the art when practicing the present technology. Persons of ordinary skill in the art will also readily appreciate that other system embodiments are possible.

Example system and/or computing device 600 includes a processing unit (CPU or processor) 610 and a system bus 605 that couples various system components including the system memory 615 such as read only memory (ROM) 620 and random access memory (RAM) 635 to the processor 610. The processors of FIG. 1 (i.e., the downhole processor 44, the local processor 16, and the remote processor 12, can all be forms of this processor 610. The system 600 can include a cache 612 of high-speed memory connected directly with, in close proximity to, or integrated as part of the processor 610. The system 600 copies data from the memory 615 and/or the storage device 630 to the cache 612 for quick access by the processor 610. In this way, the cache provides a performance boost that avoids processor 610 delays while waiting for data. These and other modules can control or be configured to control the processor 610 to perform various operations or actions. Other system memory 615 may be available for use as well. The memory 615 can include multiple different types of memory with different performance characteristics. It can be appreciated that the disclosure may operate on a computing device 600 with more than one processor 610 or on a group or cluster of computing devices networked together to provide greater processing capability. The processor 610 can include any general purpose processor and a hardware module or software module, such as module 1 632, module 2 634, and module 3 636 stored in storage device 630, configured to control the processor 610 as well as a special-purpose processor where software instructions are incorporated into the processor. The processor 610 may be a self-contained computing system, containing multiple cores or processors, a bus, memory controller, cache, etc. A multi-core processor may be symmetric or asymmetric. The processor 610 can include multiple processors, such as a system having multiple, physically separate processors in different sockets, or a system having multiple processor cores on a single physical chip. Similarly, the processor 610 can include multiple distributed processors located in multiple separate computing devices, but working together such as via a communications network. Multiple processors or processor cores can share resources such as memory 615 or the cache 612, or can operate using independent resources. The processor 610 can include one or more of a state machine, an application specific integrated circuit (ASIC), or a programmable gate array (PGA) including a field PGA.

The system bus 605 may be any of several types of bus structures including a memory bus or memory controller, a peripheral bus, and a local bus using any of a variety of bus architectures. A basic input/output (BIOS) stored in ROM 620 or the like, may provide the basic routine that helps to transfer information between elements within the computing device 600, such as during start-up. The computing device 600 further includes storage devices 630 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 630 can include software modules 632, 634, 636 for controlling the processor 610. The system 600 can include other hardware or software modules. The storage device 630 is connected to the system bus 605 by a drive interface. The drives and the associated computer-readable storage devices provide nonvolatile storage of computer-readable instructions, data structures, program modules and other data for the computing device 600. In one aspect, a hardware module that performs a particular function includes the software component stored in a tangible computer-readable storage device in connection with the necessary hardware components, such as the processor 610, bus 605, display 170, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the device 600 is a small, handheld computing device, a desktop computer, or a computer server. When the processor 610 executes instructions to perform "operations", the processor 610 can perform the operations directly and/or facilitate, direct, or cooperate with another device or component to perform the operations.

Although the exemplary embodiment(s) described herein employs the hard disk 630, other types of computer-readable storage devices which can store data that are accessible by a computer, such as magnetic cassettes, flash memory cards, digital versatile disks (DVDs), cartridges, random access memories (RAMs) 635, read only memory (ROM) 620, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 600, an input device 190 represents any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems enable a user to provide multiple types of input to communicate with the computing device 600. The communications interface 640 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 610. The functions these blocks represent may be provided through the use of either shared or dedicated hardware, including, but not limited to, hardware capable of executing software and hardware, such as a processor 610, that is purpose-built to operate as an equivalent to software executing on a general purpose processor. For example the functions of one or more processors presented in FIG. 6 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 620 for storing software performing the operations described below, and random access memory (RAM) 635 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 600 shown in FIG. 6 can practice all or part of the recited methods, can be a part of the recited systems, and/or can operate according to instructions in the recited tangible computer-readable storage devices. Such logical operations can be implemented as modules configured to control the processor 610 to perform particular functions according to the programming of the module. For example, FIG. 6 illustrates three modules Mod1 632, Mod2 634 and Mod3 636 which are modules configured to control the processor 610. These modules may be stored on the storage device 630 and loaded into RAM 635 or memory 615 at runtime or may be stored in other computer-readable memory locations.

One or more parts of the example computing device 600, up to and including the entire computing device 600, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 610 can include all types of processors disclosed herein, including a virtual processor. However, when referring to a virtual processor, the processor 610 includes the software components associated with executing the virtual processor in a virtualization layer and underlying hardware necessary to execute the virtualization layer. The system 600 can include a physical or virtual processor 610 that receive instructions stored in a computer-readable storage device, which cause the processor 610 to perform certain operations. When referring to a virtual processor 610, the system also includes the underlying physical hardware executing the virtual processor 610.

Embodiments within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the above description, terms such as "upper," "upward," "lower," "downward," "above," "below," "downhole," "uphole," "longitudinal," "lateral," and the like, as used herein, shall mean in relation to the bottom or furthest extent of, the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicate that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Claim language reciting "at least one of" a set indicates that one member of the set or multiple members of the set satisfy the claim. For example, claim language reciting "at least one of A and B" means A, B, or A and B.

Statements of the Disclosure Include:

Statement 1: A method comprising: generating a known magnetic field via a magnetic field source that is coupled to a downhole tool, wherein the magnetic field source is located within a fixed distance from one or more sensors coupled to the downhole tool; obtaining respective field measurements of the known magnetic field from the one or more sensors; comparing the respective field measurements from the one or more sensors with respective reference measurements previously obtained from the one or more sensors to yield respective comparisons; and based on the respective comparisons, determining a respective sensitivity drift for each of the one or more sensors.

Statement 2: The method according to Statement 1, wherein the magnetic field source comprises a coil around a circumference of the downhole tool, and wherein the one or more sensors are placed around the circumference of the downhole tool within the fixed distance from the coil.

Statement 3: The method according to Statement 1 or Statement 2, wherein the magnetic field source comprises a second coil around the circumference of the downhole tool and within a second fixed distance from the one or more sensors.

Statement 4: The method according to any one of Statements 1 to 3, wherein the respective reference measurements comprise magnetic field measurements obtained by the one or more sensors in a controlled environment.

Statement 5: The method according to any one of Statements 1 to 4, wherein the controlled environment comprises at least one of a controlled temperature, a known Earth magnetic field, a known pressure, and a known current or magnetic field source.

Statement 6: The method according to any one of Statements 1 to 5, wherein the obtaining of respective field measurements is performed while the downhole tool is conducting operations downhole.

Statement 7: The method according to any one of Statements 1 to 6, wherein determining the respective sensitivity drift for each of the one or more sensors comprises: for each sensor from the one or more sensors, calculating an absolute amplitude calibration coefficient by dividing a respective field measurement for that sensor by a respective reference measurement for that sensor; wherein the respective sensitivity drift is based on the absolute amplitude calibration coefficient.

Statement 8: The method according to any one of Statements 1 to 7, wherein the one or more sensors comprise a plurality of sensors, and wherein determining the respective sensitivity drift for each of the plurality of sensors comprises, for each sensor from the plurality of sensors: calculating a relative reference coefficient by dividing a first reference measurement for the sensor with a second reference measurement for a reference sensor from the plurality of sensors; calculating a relative field coefficient by dividing a first field measurement for the sensor with a second field measurement for the reference sensor from the plurality of sensors; and calculating a relative calibration coefficient by dividing the relative field coefficient by the relative reference coefficient; wherein the respective sensitivity drift is based on the relative calibration coefficient.

Statement 9: The method according to any one of Statements 1 to 8, wherein the magnetic field source comprises one of a coil antenna, a solenoid, and a toroid, and wherein the fixed distance between the magnetic field source and the one or more sensors is within a range of the magnetic.

Statement 10: The method according to any one of Statements 1 to 9, wherein the magnetic field source has a constant current source, and wherein the known magnetic field has a known strength based on the constant current source, the method further comprising: obtaining additional field measurements of the known magnetic field from the one or more sensors; and calibrating respective values of the additional field measurements based on the respective sensitivity drift.

Statement 11: A system comprising: a magnetic field source coupled to a downhole tool, the magnetic field source being located within a fixed distance from one or more sensors coupled to the magnetic field source, wherein the magnetic field source is configured to generate a magnetic field, wherein the fixed distance is within a range of the magnetic field; the one or more sensors coupled to the downhole tool, the one or more sensors being configured to obtain respective measurements of the magnetic field generated by the magnetic field source; one or more processors; and a computer-readable storage medium having stored therein instructions which, when executed by the one or more processors, cause the one or more processors to perform operations comprising: comparing respective field measurements from the one or more sensors with respective reference measurements previously obtained from the one or more sensors to yield respective comparisons; and based on the respective comparisons, determining a respective sensitivity drift for each of the one or more sensors.

Statement 12: The system according to Statement 11, wherein the magnetic field source comprises at least one coil around a circumference of the downhole tool, and wherein the one or more sensors are placed around the circumference of the downhole tool within the fixed distance from the at least one coil.

Statement 13: The system according to Statement 11 or 12, wherein the respective reference measurements comprise magnetic field measurements obtained by the one or more sensors in a controlled environment comprising at least one of a controlled temperature, a known Earth magnetic field, a known pressure, and a known current or magnetic field source.

Statement 14: The system according to any of Statements 11 to 13, wherein determining the respective sensitivity drift for each of the one or more sensors comprises: for each sensor from the one or more sensors, calculating an absolute amplitude calibration coefficient by dividing a respective field measurement for that sensor by a respective reference measurement for that sensor; wherein the respective sensitivity drift is based on the absolute amplitude calibration coefficient.

Statement 15: The system according to any one of Statements 11 to 14, wherein the one or more sensors comprise a plurality of sensors, and wherein determining the respective sensitivity drift for each of the plurality of sensors comprises, for each sensor from the plurality of sensors: calculating a relative reference coefficient by dividing a first reference measurement for the sensor with a second reference measurement for a reference sensor from the plurality of sensors; calculating a relative field coefficient by dividing a first field measurement for the sensor with a second field measurement for the reference sensor from the plurality of sensors; and calculating a relative calibration coefficient by dividing the relative field coefficient by the relative reference coefficient; wherein the respective sensitivity drift is based on the relative calibration coefficient.

Statement 16: A computer-readable device having stored therein instructions which, when executed by a processor, cause the processor to perform operations comprising: generating a magnetic field via a magnetic field source that is coupled to a downhole tool, wherein the magnetic field source is located within a fixed distance from one or more sensors coupled to the downhole tool; obtaining respective field measurements of the known magnetic field from the one or more sensors; comparing the respective field measurements from the one or more sensors with respective reference measurements previously obtained from the one or more sensors to yield respective comparisons; and based on the respective comparisons, determining a respective sensitivity drift for each of the one or more sensors.

Statement 17: The computer-readable device according to Statement 16, wherein the magnetic field source comprises a coil around a circumference of the downhole tool, and wherein the one or more sensors are placed around the circumference of the downhole tool within the fixed distance from the coil.

Statement 18: The computer-readable device according to Statement 16 or 17, wherein determining the respective sensitivity drift for each of the one or more sensors comprises: for each sensor from the one or more sensors, calculating an absolute amplitude calibration coefficient by dividing a respective field measurement for that sensor by a respective reference measurement for that sensor; wherein the respective sensitivity drift is based on the absolute amplitude calibration coefficient.

Statement 19: The computer-readable device according to any of Statements 16 to 18, wherein the one or more sensors comprise a plurality of sensors, and wherein determining the respective sensitivity drift for each of the one or more sensors comprises, for each sensor from the plurality of sensors: calculating a relative reference coefficient by dividing a first reference measurement for the sensor with a second reference measurement for a reference sensor from the plurality of sensors; calculating a relative field coefficient by dividing a first field measurement for the sensor with a second field measurement for the reference sensor from the plurality of sensors; and calculating a relative calibration coefficient by dividing the relative field coefficient by the relative reference coefficient; wherein the respective sensitivity drift is based on the relative calibration coefficient.

Statement 20: The computer-readable device according to any one of Statements 16 to 19, wherein the respective reference measurements comprise magnetic field measurements obtained by the one or more sensors in a controlled environment, wherein the controlled environment comprises at least one of a controlled temperature, a known Earth magnetic field, a known pressure, and a known current or magnetic field source.

Statement 21: A computer-readable device having stored therein instructions which, when executed by a processor, cause the processor to perform a method according to any of the methods from Statements 1 through 10.

Statement 22: A system comprising one or more processors and one or more computer-readable storage media having stored therein instructions which, when executed by the one or more processors, cause the one or more processors to perform a method according to any of the methods from Statements 1 through 10.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. Rather, the described features and steps are disclosed as possible components of systems and methods within the scope of the appended claims. Moreover, claim language reciting "at least one of" a set indicates that one member of the set or multiple members of the set satisfy the claim.

What is claimed is:

1. A method comprising:
generating a known magnetic field via a known magnetic field source that is coupled to a downhole tool, wherein the known magnetic field source is located within a fixed distance from one or more sensors coupled to the downhole tool, wherein the known magnetic field has a known magnetic field strength at the one or more sensors based on the known magnetic field source;
obtaining respective field measurements of the known magnetic field from the one or more sensors, the respective field measurements of the known magnetic field being measured by the one or more sensors directly from the known magnetic field source;
comparing the respective field measurements of the known magnetic field obtained from the one or more sensors with the known magnetic field strength and respective reference measurements previously obtained from the one or more sensors to yield respective comparisons;
based on the respective comparisons, determining a respective sensitivity drift for each of the one or more sensors, wherein determining the respective sensitivity drift for each of the one or more sensors comprises:
for each sensor from the one or more sensors, calculating an absolute amplitude calibration coefficient by dividing a respective field measurement for that sensor by respective reference measurement for that sensor, wherein the respective sensitivity drift is based on the absolute amplitude calibration coefficient; and
calibrating the downhole tool based on the respective sensitivity drift determined for each of the one or more sensors.

2. The method of claim 1, wherein the known magnetic field source comprises a coil around a circumference of the downhole tool, and wherein the one or more sensors are placed around the circumference of the downhole tool within the fixed distance from the coil.

3. The method of claim 2, wherein the known magnetic field source comprises a second coil around the circumference of the downhole tool and within a second fixed distance from the one or more sensors.

4. The method of claim 1, wherein the respective reference measurements comprise magnetic field measurements obtained by the one or more sensors in a controlled environment.

5. The method of claim 4, wherein the controlled environment comprises at least one of a controlled temperature, a known Earth magnetic field, a known pressure, and a known current or magnetic field source.

6. The method of claim 1, wherein obtaining of the respective field measurements is performed while the downhole tool is conducting operations downhole.

7. The method of claim 1, wherein the one or more sensors comprise a plurality of sensors, and wherein determining the respective sensitivity drift for each of the plurality of sensors comprises, for each sensor from the plurality of sensors:
calculating a relative reference coefficient by dividing a first reference measurement for the sensor with a second reference measurement for a reference sensor from the plurality of sensors;
calculating a relative field coefficient by dividing a first field measurement for the sensor with a second field measurement for the reference sensor from the plurality of sensors; and calculating a relative calibration coefficient by dividing the relative field coefficient by the relative reference coefficient;

wherein the respective sensitivity drift is based on the relative calibration coefficient.

8. The method of claim 1, wherein the known magnetic field source comprises one of a coil antenna, a solenoid, and a toroid, and wherein the fixed distance between the known magnetic field source and the one or more sensors is within a range of the known magnetic field source.

9. The method of claim 1, further comprising:
obtaining additional field measurements of the known magnetic field from the one or more sensors; and
calibrating respective values of the additional field measurements based on the respective sensitivity drift.

10. A system comprising:
a known magnetic field source coupled to a downhole tool, the known magnetic field source being located within a fixed distance from one or more sensors coupled to the known magnetic field source, wherein the known magnetic field source is configured to generate a known magnetic field, wherein the fixed distance is within a range of the known magnetic field, wherein the known magnetic field has a known magnetic field strength at the one or more sensors based on the known magnetic field source;
the one or more sensors coupled to the downhole tool, the one or more sensors being configured to obtain respective field measurements of the known magnetic field generated by the known magnetic field source, the respective field measurements of the known magnetic field being measured by the one or more sensors directly from the known magnetic field source;
one or more processors; and
a computer-readable storage medium having stored therein instructions which, when executed by the one or more processors, cause the one or more processors to perform operations comprising:
comparing respective field measurements of the known magnetic field obtained from the one or more sensors the known magnetic field strength and with respective reference measurements previously obtained from the one or more sensors to yield respective comparisons;
based on the respective comparisons, determining a respective sensitivity drift for each of the one or more sensors, wherein determining the respective sensitivity drift for each of the one or more sensors comprises:
for each sensor from the one or more sensors, calculating an absolute amplitude calibration coefficient by dividing a respective field measurement for that sensor by respective reference measurement for that sensor, wherein the respective sensitivity drift is based on the absolute amplitude calibration coefficient; and
calibrating the downhole tool based on the respective sensitivity drift determined for each of the one or more sensors.

11. The system of claim 10, wherein the known magnetic field source comprises at least one coil around a circumference of the downhole tool, and wherein the one or more sensors are placed around the circumference of the downhole tool within the fixed distance from the at least one coil.

12. The system of claim 10, wherein the respective reference measurements comprise magnetic field measurements obtained by the one or more sensors in a controlled environment comprising at least one of a controlled temperature, a known Earth magnetic field, a known pressure, and a known current or magnetic field source.

13. The system of claim 10, wherein the one or more sensors comprise a plurality of sensors, and wherein determining the respective sensitivity drift for each of the plurality of sensors comprises, for each sensor from the plurality of sensors:
calculating a relative reference coefficient by dividing a first reference measurement for the sensor with a second reference measurement for a reference sensor from the plurality of sensors;
calculating a relative field coefficient by dividing a first field measurement for the sensor with a second field measurement for the reference sensor from the plurality of sensors; and
calculating a relative calibration coefficient by dividing the relative field coefficient by the relative reference coefficient;
wherein the respective sensitivity drift is based on the relative calibration coefficient.

14. A computer-readable device having stored therein instructions which, when executed by at least one processor, cause the at least one processor to perform operations comprising:
generating a known magnetic field via a known magnetic field source that is coupled to a downhole tool, wherein the known magnetic field source is located within a fixed distance from one or more sensors coupled to the downhole tool, wherein the known magnetic field has a known magnetic field strength at the one or more sensors based on the known magnetic field source;
obtaining respective field measurements of the known magnetic field from the one or more sensors, the respective field measurements of the known magnetic field being measured by the one or more sensors directly from the known magnetic field source;
comparing the respective field measurements of the known magnetic field obtained from the one or more sensors with the known magnetic field strength and respective reference measurements previously obtained from the one or more sensors to yield respective comparisons;
based on the respective comparisons, determining a respective sensitivity drift for each of the one or more sensors, wherein determining the respective sensitivity drift for each of the one or more sensors comprises:
for each sensor from the one or more sensors, calculating an absolute amplitude calibration coefficient by dividing a respective field measurement for that sensor by respective reference measurement for that sensor, wherein the respective sensitivity drift is based on the absolute amplitude calibration coefficient; and
calibrating the downhole tool based on the respective sensitivity drift determined for each of the one or more sensors.

15. The computer-readable device of claim 14, wherein the known magnetic field source comprises a coil around a circumference of the downhole tool, and wherein the one or more sensors are placed around the circumference of the downhole tool within the fixed distance from the coil.

16. The computer-readable device of claim 14, wherein the one or more sensors comprise a plurality of sensors, and wherein determining the respective sensitivity drift for each of the one or more sensors comprises, for each sensor from the plurality of sensors:

calculating a relative reference coefficient by dividing a first reference measurement for the sensor with a second reference measurement for a reference sensor from the plurality of sensors;

calculating a relative field coefficient by dividing a first field measurement for the sensor with a second field measurement for the reference sensor from the plurality of sensors; and calculating a relative calibration coefficient by dividing the relative field coefficient by the relative reference coefficient;

wherein the respective sensitivity drift is based on the relative calibration coefficient.

17. The computer-readable device of claim 14, wherein the respective reference measurements comprise magnetic field measurements obtained by the one or more sensors in a controlled environment, wherein the controlled environment comprises at least one of a controlled temperature, a known Earth magnetic field, a known pressure, and a known current or magnetic field source.

* * * * *